Patented May 28, 1940

2,202,801

UNITED STATES PATENT OFFICE 2,202,801

HIGH VISCOSITY INDEX, HIGH VISCOSITY OIL COMPOSITIONS

Charles N. Kimberlin, Baton Rouge, La., assignor to Standard Oil Development Company, a corporation of Delaware No Drawing. Application January 21, 1938, Serial No. 186,079

7 Claims. (Cl. 87—9)

This invention relates to the production of valuable high viscosity, high viscosity index compositions. The invention is particularly concerned with an improved process for economically producing high viscosity, high viscosity index compositions of a specific character by subjecting oils, especially fatty oils, to the action of the silent electric discharge. The process of this invention secures improved compositions by voltolizing a relatively low viscosity, high viscosity index oil to a relatively high viscosity and then blending with said voltolized oil an unvoltolized low viscosity, high viscosity index oil to secure a high viscosity index composition of the desired high viscosity. By this method of blending a voltolized relatively high viscosity oil with an unvoltolized low viscosity oil, considerable economics are effected in securing a high viscosity index oil of a certain viscosity over the process of voltolizing an entire oil composition to the same viscosity.

The initial materials of the present invention are any suitable low viscosity, high viscosity index oils. The preferred materials are unsaturated oils and especially unsaturated fish oils as, for example, sperm oil. Other oils as, for example, menhaden and rapeseed, are also entirely satisfactory. This class of oils includes those oils having iodine values above 60.

The preferred compositions of the present invention are secured by using initial materials as, for example, sperm and rapeseed oils. The crude sperm oil may be used directly as obtained or may be pretreated or separated into a particular fraction desired. For example, the spermaceti may be separated from the oil and the dewaxed or partially dewaxed oil may be treated in accordance with the present invention.

These initial materials are subjected to the effect of the silent electric glow discharge, which process is known as voltolization. In this process the material is passed through a high tension silent electric discharge field, preferably a field set up by alternating current. The treatment is usually carried out at pressures from 0.01 to 0.1 atmosphere to .5 atmosphere, or higher. The voltage is preferably in the range of 1,000 to 10,000 volts although voltages as high as 50,000 or higher may be employed. The frequency of the alternating current is usually in the range from 600 cycles to 1,200 or 10,000 cycles, or more. The temperature of the reaction is maintained below that causing decomposition of the oil, preferably below about 100° C. The heat generated in the reaction zone is usually sufficient to raise the temperature of the mixture from 100 to 200° C. or higher. It is, therefore, necessary that this heat be carried away by external cooling means if these temperatures are detrimental to the product of the reaction.

The apparatus employed may be of any particular type. The usual type is either the tube or the trommel design. The tube design comprises a vertical tube, preferably constructed of a dielectric material such as glass coated on the outside with a conductor electrode, a central electrode being disposed in the center of this tube, and provision being made for creating a high tension silent electric discharge between the electrodes. The trommel design comprises a series of insulated plates which are mounted on a rotatable shaft a few millimeters apart, alternate plates being connected to opposite electrical potentials. The shaft and the plates are contained in a horizontal drum which contains the material being treated, into which the outer sections of the plates dip as they rotate on the shaft. The high tension electric discharge is set up between the respective plates and the pressure in this type of apparatus is generally maintained below 20 centimeters of mercury, preferably from 2 to 10 centimeters of mercury. The voltage across the plates is usually from 1,000 to 10,000 or more volts and the frequency is from 600 to 10,000 cycles per second or more.

The oils of the present invention may be voltolized in the pure, commercial or crude state or after being pretreated by other means, for example with adsorptive clay or with solvent extraction, etc.

It has been found that if these suitable initial materials are voltolized to a high viscosity and then blended with an untreated low viscosity high viscosity index oil, a composition having superior properties and characteristics will be economically secured. In this manner, a superior high viscosity, high viscosity index oil composition of a preferred analysis may be prepared. The voltolized oil fraction may be thickened to any desirable viscosity. It is, however, preferred to thicken these materials to a viscosity of at least 1,000 seconds Saybolt Universal at 210° F. It is especially preferred to treat these materials to a viscosity of from 1,000 to 5,000 seconds Saybolt at 210° F. or higher depending upon the initial material employed and the particular blend desired. For example, if oils of the type of glyceride esters are employed as, for example, rapeseed oil, and the voltolization is conducted to secure merely a dimer, the product will have a viscosity somewhat about 1000 at 210° F. Then if this oil be blended with unvoltolized rapeseed oil to give a blend of 100 viscosity at 210° F., the composition of this blend would probably approximate the composition of rapeseed oil voltolized to 100 viscosity at 210° F. Therefore, in voltolizing oils of this character in order to secure desirable compositions, and in order to effect appreciable savings in electrical energy input, it is necessary that the voltolized product have a viscosity at 210° F. well above 1,000 viscosity, preferably in the range above 3,000 viscosity at 210° F.

These voltolized materials are then blended with a low viscosity, preferably a high viscosity index oil, to secure a blend having the desired properties. The voltolized materials are entirely soluble in unvoltolized oil and the proportions of the voltolized materials and the unvoltolized material may vary within wide limits. For example, the blend may consist of 75% voltolized material and 25% unvoltolized material. It is, however, preferred to have a blend comprising from 20 to 40% of the voltolized material and from 60 to 80% of the unvoltolized material, preferably a blend in which the voltolized ingredient and unvoltolized ingredient are the same oil.

However, satisfactory results are secured in a very economical manner by cross-blending of various fatty oils and the like. Thus it is desirable to voltolize a relatively inexpensive fatty oil as, for example, menhaden oil, and to blend back with an oil such as sperm oil. This latter oil has a high flash point, a high viscosity index and low viscosity and is, therefore, a desirable blending agent. On the other hand, menhaden oil is of the class of oils which, for a desired viscosity voltolization product, requires a relatively lower electrical energy input, as compared to oils such as sperm.

The following specific examples serve to illustrate the invention and are not to be construed to limit the invention in any manner whatsoever:

EXAMPLE 1

A crude sperm oil having a viscosity of 41 seconds Saybolt at 210° F. and a viscosity index of 190 was subjected to the effects of the silent electric discharge and thickened to a viscosity of 1,000 seconds Saybolt at 210° F. 30% of the voltolized sperm oil was then blended with 70% of the crude sperm oil, resulting in a blend having the following characteristics:

| Saybolt Universal vis./100° F. | Saybolt Universal vis./210° F. | Viscosity Index |
|---|---|---|
| 518 | 110 | 149 |

EXAMPLE 2

A crude sperm oil having a viscosity of 41 seconds Saybolt at 210° F. and a viscosity index of 190 was voltolized to a viscosity of 1,000 seconds at 210° F. This material consisted of polymers produced by the voltolization and about 5 to 15% of unconverted monomer. The relative proportions of the polymers vary somewhat with the rate of voltolization, but in general the constituents are present in approximately the following percentages:

*Voltolized Sperm Oil—Viscosity 1,000 Sec./210° F.*

|  | Per cent |
|---|---|
| Monomer | 10 |
| Dimer | 9 |
| Trimer | 18 |
| Tetramer | 36 |
| Pentamer | 18 |
| Higher polymers | 9 |

EXAMPLE 3

Blends comprising 30% of a voltolized sperm oil having a viscosity of 1,000 seconds at 210° F. and 70% of an unvoltolized crude sperm oil, blended to a viscosity of 110 seconds at 210° F., have approximately the following range of compositions:

*30% 1000/210° F.—70% Unvoltolized Blend 110 Sec./210° F.*

|  | Per cent |
|---|---|
| Monomer | 70–76 |
| Dimer | 2– 4 |
| Trimer | 4– 7 |
| Tetramer | 9–14 |
| Pentamer | 4– 7 |
| Higher polymers | 2– 4 |

EXAMPLE 4

A crude sperm oil having a viscosity of 41 seconds Saybolt at 210° F. was voltolized to a viscosity of 110 seconds Saybolt at 210° F. This material has approximately the following composition:

*Vol. Sperm 110/210° F.*

|  | Per cent |
|---|---|
| Monomer | 50–60 |
| Dimer | 35–45 |
| Trimer | 5–10 |
| Tetramer | 1– 3 |
| Pentamer | – |
| Higher polymers | – |

The above data clearly show the critical differences in composition secured when voltolizing a sperm oil to a high viscosity and then preparing a high viscosity blend of the voltolized sperm oil and the unvoltolized sperm oil from that secured by merely voltolizing the sperm oil to the desired relatively high viscosity.

EXAMPLE 5

A crude sperm oil having a viscosity of 41 seconds Saybolt at 210° F. was voltolized to a viscosity of 110 seconds at 210° F. The energy required per gallon of product in this test was taken as 100. The results were as follows:

| Viscosity of voltol | Viscosity of blend | Percent energy required per gallon of product |
|---|---|---|
| 110 | 110 | 100 |

EXAMPLE 6

The sperm oil described in the above example was subjected to the effect of the silent electric discharge and was voltolized to a viscosity of 1,000 seconds Saybolt at 210° F. 30% of this material was then blended with 70% of unvoltolized crude sperm oil to a blend having a viscosity of 110 seconds at 210° F. The results were:

| Viscosity of voltol | Viscosity of blend | Percent energy required per gallon of product |
|---|---|---|
| 1000 | 110 | 35 |

EXAMPLE 7

The sperm oil as described in the preceding examples was voltolized to a viscosity of 5,000 seconds Saybolt at 210° F. 20% of this material was then blended with 80% of unvoltolized crude sperm oil with the following results:

| Viscosity of voltol | Viscosity of blend | Percent energy required per gallon of product |
|---|---|---|
| 5000 | 110 | 25 |

The above examples clearly demonstrate the marked economic advantage of voltolizing to a relatively high viscosity a relatively small portion of the initial materials and then preparing a blend of the desired viscosity. For example, to prepare a high viscosity product by voltolizing the entire material to 110 seconds at 210° F. would cost 300% more than by voltolizing 20% of the material to 5,000 viscosity at 210° F. and then preparing a blend having a viscosity of 110 seconds at 210° F.

EXAMPLE 8

The sperm oil as described in the preceding examples was voltolized to a viscosity of 1,000 seconds Saybolt at 210° F. The percent of energy required per gallon of product was taken as 100. The results of this test were as follows:

| Viscosity of voltol | Viscosity of blend | Percent energy required per gallon of product |
|---|---|---|
| 1000 | 1000 | 100 |

EXAMPLE 9

The sperm oil of the preceding examples was subjected to the effect of the silent electric discharge and was thickened to a viscosity of 5,000 seconds Saybolt at 210° F. 80% of this material was blended with 20% of unvoltolized sperm oil, giving a blend having a viscosity of 1,000 seconds Saybolt at 210° F. The results were:

| Viscosity of voltol | Viscosity of blend | Percent energy required per gallon of product |
|---|---|---|
| 5000 | 1000 | 85 |

The data presented in Examples 8 and 9 clearly show the economic advantage of the present invention in which the cost of a product having a particular viscosity is reduced 15% by the present process.

The conditions and relative percentages employed in the present invention may be varied widely. It is preferred to have a relatively large percentage of the monomer and small percentages of the dimer, trimer, tetramer and higher polymers. The concentration of a monomer may be as low as 40% and the dimer, trimer and higher polymers be contained in relatively equal parts. The voltolized material may be subsequently treated before preparing the blend as, for instance, solvent extraction, hydrogenation, or may be distilled to secure a particularly desirable fraction. The unvoltolized material may also be pretreated in various manners before blending as, for example, clay treating, solvent extracting or distillation, to secure a particular desirable fraction.

The above invention is not to be limited by any theory or as to its mode of operation but only by the following claims in which it is desired to claim all novelty in so far as the prior art permits.

I claim:

1. A high viscosity, high viscosity index oil composition comprising a polymerized high viscosity, high viscosity index oil which has been secured by subjecting sperm oil to the effect of the silent electric glow discharge and non-polymerized sperm oil.

2. A high viscosity, high viscosity index oil composition comprising 20% to 75% of a polymerized high viscosity, high viscosity index oil which has been secured by subjecting sperm oil to the effect of the silent electric glow discharge and from 80% to 25% of a non-polymerized sperm oil.

3. A high viscosity, high viscosity index oil composition having a viscosity Saybolt of at least 100 seconds at 210° F. comprising a polymerized sperm oil which has been thickened to at least 1000 seconds at 210° F. by subjecting crude sperm oil to the effect of the silent electric glow discharge and a non-polmerized sperm oil.

4. A high viscosity, high viscosity index oil composition secured by blending polymerized sperm oil which has been thickened to at least 1000 seconds at 210° F. by subjecting crude sperm oil to the effect of the silent electric glow discharge with non-polymerized sperm oil.

5. A high viscosity, high viscosity index oil composition having a viscosity index in the range above about 140 comprising polymerized sperm oil which has been thickened to at least 1000 seconds at 210° F. by subjecting the same to the effect of the silent electric glow discharge and nonpolymerized sperm oil.

6. Process for the production of a high viscosity, high viscosity index oil composition comprising subjecting crude sperm oil to the effect of the silent electric glow discharge under conditions to form a polymerized oil, blending said polymerized oil with crude non-polymerized sperm oil.

7. Process for the production of an oil composition having a Saybolt viscosity at 210° F. of about 110 and a viscosity index of about 150 comprising subjecting crude sperm oil to the effect of the silent electric glow discharge under conditions to form a polymerized product having a viscosity Saybolt at 210° F. of about 1000, then blending about 30% of said polymerized oil with about 70% of a non-polymerized sperm oil.

CHARLES N. KIMBERLIN.